US009207310B2

(12) United States Patent
Klose et al.

(10) Patent No.: US 9,207,310 B2
(45) Date of Patent: Dec. 8, 2015

(54) LOCATING APPARATUSES BY MEANS OF AUDIO SIGNALS USING A DETERMINISTIC DATA CHANNEL

(71) Applicant: AIRBUS OPERATIONS GMBH, Hamburg (DE)

(72) Inventors: Peter Klose, Hamburg (DE); Wolfgang Fischer, Hamburg (DE); Stefan Schneele, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/929,434

(22) Filed: Jun. 27, 2013

(65) Prior Publication Data
US 2014/0003194 A1 Jan. 2, 2014

Related U.S. Application Data

(60) Provisional application No. 61/665,953, filed on Jun. 29, 2012.

(30) Foreign Application Priority Data

Jun. 29, 2012 (DE) .......................... 10 2012 012 972

(51) Int. Cl.
G01S 11/00 (2006.01)
G01S 11/16 (2006.01)
G01S 11/14 (2006.01)
(Continued)

(52) U.S. Cl.
CPC . *G01S 11/16* (2013.01); *G01S 5/18* (2013.01); *G01S 11/14* (2013.01); *B64D 11/0015* (2013.01)

(58) Field of Classification Search
CPC ..... G01S 3/80; G01S 3/8083; G01S 11/0015; G01S 11/14; G01S 11/16; G01S 5/18
USPC ........................................ 367/128; 244/118.6
See application file for complete search history.

(56) References Cited

U.S. PATENT DOCUMENTS 3,838,212 A * 9/1974 Whetstone et al. ........ 178/18.04
4,207,571 A 6/1980 Passey
4,488,000 A * 12/1984 Glenn ........................ 178/18.04
(Continued)

FOREIGN PATENT DOCUMENTS

DE 28 13 273 10/1978
DE 601 07 373 11/2005
(Continued)

Primary Examiner — Luke Ratcliffe
Assistant Examiner — Hovhannes Baghdasaryan
(74) Attorney, Agent, or Firm — Dickinson Wright PLLC

(57) ABSTRACT

A locating device for locating at least one apparatus which is arrangeable on board a transport unit, for example an aircraft, a locating system having such a locating device and at least one apparatus to be located, an aircraft having a locating system of this type, an associated method for locating at least one apparatus which is to be located and is arrangeable on board a transport unit, for example on board an aircraft, and a computer program for carrying out the method. The locating device includes a detecting unit for detecting a wireless audio signal transmitted by the apparatus to be located; and a computing unit for determining the distance of the apparatus to be located from the detecting unit based on the wireless audio signal and on a first information signal assigned to the audio signal and transmitted via a first deterministic data connection.

9 Claims, 3 Drawing Sheets

(51) Int. Cl.
*G01S 5/18* (2006.01)
*B64D 11/00* (2006.01)

(56) References Cited

U.S. PATENT DOCUMENTS

| | | | | |
|---|---|---|---|---|
| 4,751,689 | A * | 6/1988 | Kobayashi | 367/127 |
| 4,991,148 | A * | 2/1991 | Gilchrist | 367/124 |
| 7,710,829 | B2 * | 5/2010 | Wei et al. | 367/128 |
| 8,174,931 | B2 * | 5/2012 | Vartanian et al. | 367/99 |
| 2002/0077772 | A1 | 6/2002 | Squibbs | |
| 2003/0142587 | A1 * | 7/2003 | Zeitzew | 367/127 |
| 2007/0133352 | A1 * | 6/2007 | Kim et al. | 367/128 |
| 2007/0159924 | A1 * | 7/2007 | Vook et al. | 367/127 |
| 2007/0162185 | A1 * | 7/2007 | McFarland | 700/258 |
| 2008/0024463 | A1 * | 1/2008 | Pryor | 345/175 |
| 2009/0138920 | A1 * | 5/2009 | Anandpura | 725/76 |
| 2009/0154294 | A1 * | 6/2009 | Jeong et al. | 367/128 |
| 2009/0190441 | A1 * | 7/2009 | Zhao et al. | 367/128 |
| 2010/0012780 | A1 | 1/2010 | Kohlmeier-Beckmann | |
| 2010/0231547 | A1 * | 9/2010 | Pryor | 345/173 |
| 2011/0116345 | A1 * | 5/2011 | Miyamoto et al. | 367/124 |
| 2012/0044786 | A1 * | 2/2012 | Booij et al. | 367/127 |
| 2012/0312921 | A1 | 12/2012 | Grosse-Plankermann | |

FOREIGN PATENT DOCUMENTS

| | | |
|---|---|---|
| DE | 10 2006 006 720 | 8/2007 |
| DE | 10 2008 033 733 | 1/2010 |
| DE | 10 2009 058 849 | 6/2011 |
| EP | 0 485 879 | 5/1992 |

* cited by examiner

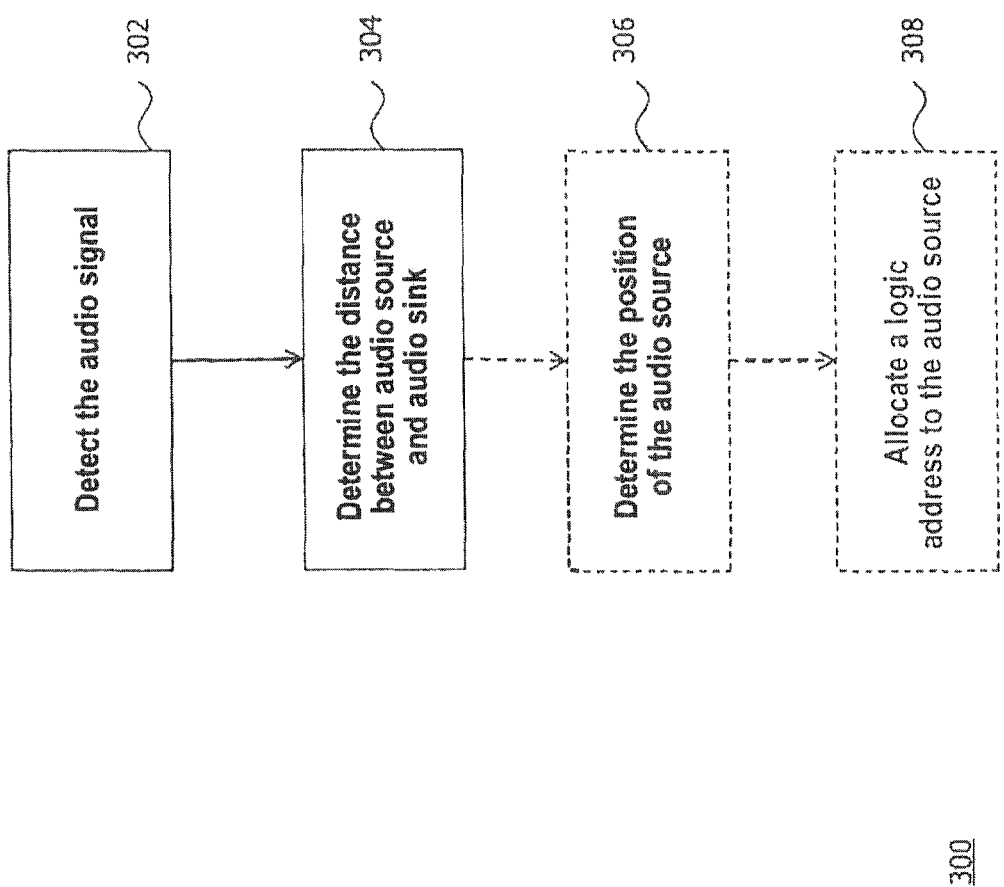

LOCATING APPARATUSES BY MEANS OF AUDIO SIGNALS USING A DETERMINISTIC DATA CHANNEL

CROSS REFERENCE TO RELATED APPLICATIONS

This application is entitled to and claims the benefit of German Application No. DE 10 2012 012 972.6 filed Jun. 29, 2012, and U.S. Provisional Application No. 61/665,953, filed Jun. 29, 2012, the disclosures of each of which, including the specification, claims, drawings and abstract, are incorporated herein by reference in their entirety.

FIELD

The present invention relates to a locating device for locating at least one apparatus which is to be located and is arrangeable on board a means of transport, for example on board an aircraft, to a locating system having such a locating device and at least one apparatus to be located, to an aircraft having a locating system of this type, to an associated method for locating at least one apparatus which is to be located and is arrangeable on board a means of transport, for example on board an aircraft, and to a computer program for carrying out the method.

BACKGROUND

On board means of transport, such as aircraft, buses, trains or ships, usually numerous apparatuses are arranged at different and often also variable positions. Some of such means of transport are, for example, equipped with passenger supply modules (often also referred to as passenger service units or personal service units (PSUs)), in order to supply passengers of the means of transport individually or display information.

The passenger cabin of a modern commercial aircraft is normally fitted with a multiplicity of PSUs which are each assigned to one passenger seat row and are arranged underneath overhead luggage compartments in a position accessible to the passengers sitting on the passenger seats. A typical PSU, as described for example in DE 10 2009 058 849 A1, comprises a loudspeaker, a display element, on which for example a fasten seat belt sign is displayed, as well as one or more reading lamp(s). Furthermore, an individually adjustable air nozzle is integrated in a conventional PSU for each passenger seat of a seat row.

In conventional cabin architectures of aircraft, the seats and accordingly also the seat rows are arranged at fixed seat positions, i.e. aircraft usually have a fixed cabin architecture. To each seat row there is usually assigned a PSU. Accordingly, above each seat row in each case at least one PSU is arranged and installed. In order to be able to carry more or fewer passengers, if required, in subregions of the aircraft cabin or the entire aircraft cabin, increasingly a more flexible cabin layout is sought. For this purpose, the seats may be displaced to increase or decrease the seat spacing in the longitudinal direction of the aircraft. Accordingly, in some cabin architectures the PSUs may be repositioned.

Several or all of the PSUs of a means of transport are normally each coupled to an interface of a so-called Decoder Encoder Unit (DEU). In conventional aircraft architectures, a DEU of type A (DEU A) forms the interface between the "Cabin Intercom and Data System" (CIDS) and the systems relevant to the passengers. A DEU A can supply a plurality of, e.g. up to three, passenger seats and is usually laid above the seats along the entire cabin. With the CIDS it is possible to check, monitor and test numerous cabin systems. For example, announcements to passengers, the internal communication of the flight crew, the illuminated warning and information signs, the general cabin lighting, the lighting of the escape routes, and entertainment systems (video, music; in relation to aircraft normally referred to as In Flight Entertainment (IFE)) are managed by the CIDS. The communication between the central computer of the CIDS (the so-called director) and the cabin systems takes place via the said DEUs.

In order to control functionalities of the PSUs, e.g. electrical functionalities such as the loudspeaker output or the output of information on the display element, usually an indirect addressing of the PSU to be controlled takes place by means of the DEU interface to which the PSU to be controlled is attached. The indirect addressing of the PSUs by means of the DEU does not allow the physical installation position, i.e. the actual position of the PSU, to be deduced. The correlation between logic address and physical position, for example the assignment of the PSU to the corresponding seat row number in the cabin, usually takes place manually by the installation personnel.

Although methods for network-wide topology recognition using network protocols such as the Link Layer Discovery Protocol (LLDP) or measurement of cable lengths/transmission times by means of the Precision Time Protocol (PTP) enable a very accurate determination of the logic sequence of apparatuses, such as PSUs, connected to the DEU, they do not allow the actual arrangement of the terminal equipment, such as its position, in the cabin of the means of transport to be deduced.

SUMMARY

It is an object of the present invention to provide a locating device, a locating system having such a locating device, an aircraft having a locating system of this type, an associated method and a computer program, by means of which apparatuses which are arrangeable on board a means of transport can be reliably located in a simple manner.

This object is achieved by the subject matter of attached claims. Specific embodiments emerge in each case from the dependent claims.

According to a first aspect, a locating device for locating at least one apparatus which is to be located and is arrangeable on board a means of transport, for example on board an aircraft, is provided. The locating device comprises a detecting unit and a computing unit. The detecting unit is configured to detect or to receive an audio signal wirelessly transmitted by the at least one apparatus to be located. The computing unit is configured to determine the distance of the at least one apparatus to be located from the detecting unit based on the audio signal transmitted by the at least one apparatus to be located and on a first information signal assigned to the audio signal and transmitted via a first deterministic data connection.

The assignment between the audio signal and the first information signal may be understood to mean that the audio signal and the first information signal are related to one another. This relationship may, for example, define that the audio signal and the first information signal are temporally related to one another and/or are assigned to the same apparatus to be located, such as e.g. are transmitted from the same apparatus to be located. The temporal relationship may, for example, be that the first information signal indicates the transmission of the audio signal by the apparatus to be located or indicates the time of transmission of the audio signal by the apparatus to be located. The indication of the time of transmission of the audio signal by the first information signal may, for example, be realised by a temporally correlated transmission of the audio signal and the first information signal.

Assignment may furthermore be understood to mean that the first information signal comprises information which identifies the audio signal more closely and/or which identifies the unit transmitting (emitting) the audio signal (the apparatus to be located) more closely. For example, both the audio signal and the first information signal may be transmitted by the same apparatus to be located. The audio signal is at least partly transmitted via a wireless interface, such as an air interface, and the first information signal is transmitted via the first deterministic data connection.

By the determination of the distance of the at least one apparatus to be located from the detecting unit, the locating device has successfully located the at least one apparatus to be located. Locating is therefore to be understood herein as meaning determining the distance between the at least one apparatus to be located and the detecting unit. Specific configurations of the locating device furthermore allow, as will be described below, determination of the position, such as e.g. the relative position of the apparatus to be located, in relation to the detecting unit or determination of the absolute position of the apparatus to be located in the means of transport.

The audio signal may be understood to mean any form of sound signal which can be emitted by a loudspeaker present in the apparatus to be located or arranged on the apparatus to be located. The apparatus to be located may, for example, be connected to a network or be arranged in a network. The network may have different network topologies, such as a ring topology, a star topology, a tree topology or a bus topology. For example, the network may be constructed as a deterministic data network having one or more data buses.

If a multiplicity of apparatuses to be located are present, all of the apparatuses to be located may be connected, via suitable interfaces, to a single deterministic network, such as a single data bus. Alternatively to this, a first subset of at least one of the multiplicity of apparatuses to be located may be connected to a first deterministic data network, such as a first data bus, and a second subset of at least one other of the multiplicity of apparatuses to be located may be connected to a second deterministic network, such as a second data bus.

The term of deterministic data network, deterministic data connection or deterministic data channel may, for example, be understood as meaning that the delay and/or the fluctuation (jitter) of the data network, the data connection or the data channel are known and constant. By virtue of the deterministic data connection (the deterministic data channel), the computing unit can make temporal statements about the first information signal. Furthermore, the computing unit can take account of the first information signal (which may also be referred to as the first data signal) to determine the distance of the at least one apparatus to be located from the detecting unit.

The computing unit may, for example, be configured to determine, based on the first information signal, the time of transmission of the audio signal from the at least one apparatus to be located. The computing unit may furthermore be configured to take account of the determined time of transmission of the audio signal on the determination of the distance of the at least one apparatus to be located from the detecting unit.

If the computing unit knows the time of transmission of the audio signal, it can calculate the sound propagating time from the difference of the time of transmission of the audio signal from the apparatus to be located and the time of reception of the audio signal at the detecting unit. The sound propagating time (sometimes also referred to as propagating time for short) of the audio signal may be understood to mean the time required by the audio signal to cover the path from the apparatus to be located as the audio source to the detecting unit as the audio sink. From the sound propagating time, the computing unit, taking account of the speed of sound in the medium present, e.g. air, can deduce the length of the path between audio source and audio sink, i.e. the distance between the apparatus to be located and the detecting unit.

If a plurality of apparatuses are to be located, the detecting unit can determine the distance of the corresponding apparatus from the detecting unit from the sound propagating time of the respective audio signal transmitted by the plurality of apparatuses to be located. If, for example, there are a plurality of apparatuses to be located, each arranged at a different location, the computing unit can determine the distance of each of the plurality of apparatuses to be located from the detecting unit.

According to a first possible embodiment of the locating device according to the first aspect, first of all the detecting unit can detect an audio signal transmitted by one of the plurality of apparatuses to be located. The transmission of the audio signal is communicated to the computing unit with the aid of the first information signal. The first information signal may be transmitted, offset by a specific time interval relative to the audio signal, by the apparatus to be located which is transmitting the audio signal. The time interval may also be zero, so that the audio signal and the first information signal are transmitted by the apparatus to be located at least almost simultaneously to one another. If it is now assumed that the first information signal is transmitted at a substantially higher speed (e.g. at 2 e8 m/s) (speed of light is approximately 3 e8 m/s; i.e. the notation 3 e8 m/s is used herein instead of the notation 300000000 m/s) than the audio signal (which is transmitted e.g. at the speed of sound of 343 m/s) and was transmitted simultaneously with the audio signal, the time of reception of the first information signal at the computing unit at least almost corresponds to the time of transmission of the audio signal. Thus, the computing unit knows the approximate time of transmission of the audio signal and can determine (from the approximate time of transmission and the time of reception of the audio signal) the approximate sound propagating time of the audio signal from the apparatus to be located transmitting the audio signal, to the detecting unit. With the aid of the approximate sound propagating time, the computing unit can determine the distance between the apparatus to be located which is transmitting the audio signal and the detecting unit, taking account of the speed of sound.

Purely by way of example, it may be assumed that the first information signal is transmitted at a speed of 2 e8 m/s over a maximum cable length of 100 m (i.e. the maximum length of the first deterministic data connection is 100 m). Given a transmission speed of the audio signal of 343 m/s (speed of sound in air at 20° C.), this results, even without knowing the exact cable length (i.e. without knowing the length of the first deterministic data connection) in a resolution of the location of better than 0.02 mm, i.e. the distance of the apparatus to be located from the detecting unit can be determined to an accuracy of at least 0.02 mm and, if necessary, the position of the apparatus to be located can be determined to an accuracy of at least 0.02 mm. Even allowing additionally for a network element with a delay of 2-3 μs, a location resolution of better than 1 mm can still be achieved, i.e. the distance of the apparatus to be located from the detecting unit can be determined to an accuracy of at least 1 mm and, if necessary, the position of the apparatus to be located can be determined to an accuracy of at least 1 mm.

According to a second possible embodiment of the locating device according to the first aspect, the first information signal may, for example, have sender address information about a logic sender address of the apparatus to be located. The sender address information may, for example, comprise information about the logic sender address or comprise the logic sender address itself. The sender address may, for example, be a temporary sender address. In accordance with this second possible embodiment, the computing unit can be configured to determine the time of transmission of the audio signal based on the sender address information.

According to a first variant of this second possible embodiment, it is conceivable, for example, that an assignment between sender address and signal propagating time is stored in the computing unit. For example, a signal propagating time may be assigned to each sender address. Thus, a first signal propagating time may be assigned to a first sender address, a second signal propagating time to a second sender address, etc. Alternatively to this, according to a second variant of the second possible embodiment, it is conceivable that the computing unit can deduce the length of the first deterministic data connection from the sender address transmitted in the first information signal. The length may, for example, be obtained from the network topology known to the computing unit. From the length of the first deterministic data connection, the computing unit can deduce the propagating time of the first information signal by the determinism of the first data channel.

Different signal propagating times of the first information signal may result from the fact that the first deterministic data connection between an apparatus to be located which is designated by the first sender address and the computing unit is different from (e.g. different in length from) the first deterministic data connection between an apparatus to be located which is designated by the second sender address and the computing unit. From the sender address transmitted to the computing unit with the first information signal, the computing unit can determine the signal propagating time to be expected of the first information signal and from this deduce the time of transmission of the first information signal transmitted via the first deterministic data connection.

In summary, according to the first possible embodiment, the computing unit can deduce the time of transmission of the audio signal by means of the time of reception of the first information signal. For example, the computing unit can equate the time of transmission of the audio signal with the time of reception of the first information signal (assuming that the propagating time of the first information signal is markedly faster than that of the audio signal and the first information signal and the audio signal were emitted simultaneously). According to the second possible embodiment, the computing unit can deduce the signal propagating time of the first information signal and thus also the time of transmission of the first information signal from the sender address.

The first information signal and the audio signal may be transmitted at a predetermined and/or variable temporal offset from one another. According to a first possible realisation of the locating device according to the first aspect, which may be combined with each of the above-described embodiments, the first information signal and the audio signal may be transmitted simultaneously by the apparatus to be located. Alternatively to this, according to a second possible realisation of the locating device according to the first aspect, which may be combined with each of the above-described embodiments, it is conceivable that the first information signal and the audio signal are transmitted by the apparatus to be located, offset by a time interval from one another which is previously known to the computing unit and/or adjustable.

According to the first possible realisation, the computing unit can immediately deduce the time of transmission of the audio signal from the determined time of transmission of the first information signal, since the two times of transmission correspond. According to the second realisation, to determine the time of transmission of the audio signal, the computing unit can take account of the previously known offset between the transmission of the audio signal and the transmission of the first information signal, in order to derive the time of transmission of the audio signal from the time of transmission of the first information signal.

The computing unit may furthermore be configured to determine the propagating time or sound propagating time of the audio signal from the determined time of transmission of the audio signal from the at least one apparatus to be located and from the time of reception of the audio signal at the detecting unit. The computing unit can determine the distance of the at least one apparatus to be located from the detecting unit from the sound propagating time of the audio signal.

In the case of a multiplicity of apparatuses to be located, the distance determination of the apparatuses may take place, for example, successively. The order of the determination may, for example, be based on the (temporary) address of the apparatuses.

According to a first possible configuration of the locating device according to the first aspect, which may be combined with each of the above-described embodiments and/or realisations, the computing unit and the detecting unit may be combined in a common unit. In this case, the time of reception of the audio signal by the detecting unit can be immediately known to the computing unit or the time of reception of the audio signal can be communicated to the computing unit by the detecting unit at least approximately without delay or with a negligible delay. In accordance with the first possible configuration, the computing unit can thus determine the sound propagating time of the audio signal without further information.

According to a second possible configuration of the locating device according to the first aspect, which may be combined with each of the above-described embodiments and/or realisations, the detecting unit and the computing unit may be arranged spatially separated from one another. The detecting unit may, for example, be connected to the computing unit via a second deterministic data connection. The detecting unit may be configured to output a second information signal via the second deterministic data connection on reception (e.g. immediately on reception) of the audio signal. The signal propagating time of the second information signal from the detecting unit to the computing unit may, for example, be ignored by the computing unit or may be known to the computing unit or may be derived from the network topology by the computing unit. The computing unit may use the signal propagating time of the second information signal to determine the time of reception of the audio signal at the detecting unit. For this, the computing unit may, for example, determine the time of reception of the audio signal at the detecting unit by subtracting the signal propagating time of the second information signal from the instant (point of time) at which it receives the second information signal. Alternatively, the computing unit (when ignoring the propagating time of the second information signal) may equate the time of reception of the second information signal (at the computing unit) with the time of reception of the audio signal at the detecting unit.

The computing unit may furthermore be configured to determine the position of the at least one apparatus to be located on board the means of transport based on the determined distance of the at least one apparatus to be located from the detecting unit. For this, the computing unit may, for example, take account of the topology of the network and/or the geometry or architecture of the cabin of the means of transport. The position of the detecting unit may be previously known to the computing unit, e.g. by a calibrating operation.

For example, the detecting unit may be arranged in the cabin such that the audio signals arrive from one direction only. It is, for example, conceivable that the detecting unit is for this purpose situated in the front region of the cabin and is arranged, in the direction of travel or flight of the means of transport, farther forwards than the apparatuses to be located. This allows the computing unit to deduce the position of the apparatus to be located based on the determined distance between the apparatus to be located and the detecting unit.

Moreover, the detecting unit may be arranged offset from the centre axis of the means of transport. If subsets of apparatuses formed from the apparatuses are arranged, for example, axially symmetrically to the centre axis and the detecting unit is arranged offset from the centre axis, the computing unit can determine for each apparatus to be located an individual and unique distance to the detecting unit and derive unique positions therefrom. Additionally or alternatively to this, even without an offset of the detecting unit (i.e. even if the detecting unit is situated on the centre axis of the means of transport), the computing unit can determine unique positions even if the subsets of apparatuses are arranged axially symmetrically. For this purpose, the computing unit may, for example, take account of the network topology. It is conceivable that a first subset of apparatuses to be located is connected to the computing unit via a first deterministic data connection and a second subset of apparatuses to be located is connected to the computing unit via a further first deterministic data connection, etc. Depending on from which of the first deterministic data connections the computing unit receives the first information signal, the computing unit can deduce the subset of apparatuses to which the corresponding apparatus belongs. If the computing unit additionally takes account of the determined distance, it can determine a unique position of the apparatus to be located.

The automatic position determination makes it possible to eliminate costly manual position determination of the apparatuses.

The computing unit may furthermore be configured to allocate a logic address to the at least one apparatus to be located. This logic address may, for example, replace the sender address. The address allocation may, for example, take place after the position determination. For the allocation of the address, the computing unit may, for example, take account of the determined position of the at least one apparatus to be located. The address allocation may take place via the same first deterministic data connection via which the first information signal was previously sent.

The position determination of the apparatus(es) to be located and the address allocation make it possible to reliably allocate a logic address automatically to an installation position of the apparatus.

According to a second aspect, a locating system for locating at least one apparatus which is to be located and is arrangeable on board a means of transport, for example on board an aircraft, is provided. The locating system comprises a locating device as described herein and the at least one apparatus to be located. The locating system may, for example, comprise a multiplicity of apparatuses to be located.

The locating system may have a microphone or be configured as such. The at least one apparatus to be located may comprise a passenger supply module having at least one loudspeaker or be configured as such. To emit the audio signal, the loudspeaker present in the passenger supply module may be used. In the case of an aircraft as the means of transport, the detecting unit may, for example, be arranged at the workspace of the purser (the senior flight attendant is often referred to as the purser) or may be configured as the handset itself.

According to a third aspect, an aircraft having the locating system as described herein is provided. The apparatuses to be located may, for example, be passenger supply modules which are arranged in the longitudinal direction of the aircraft in a known manner above the seat rows.

According to a fourth aspect, a method for locating at least one apparatus which is to be located and is arrangeable on board a means of transport, for example on board an aircraft, is provided. The method has the steps: detecting, by a detecting unit, an audio signal wirelessly transmitted by the at least one apparatus to be located; and determining, by a computing unit, the distance of the at least one apparatus to be located from the detecting unit based on the audio signal transmitted by the at least one apparatus to be located and on a first information signal assigned to the audio signal and transmitted via a first deterministic data connection.

The method may furthermore comprise determining, by the computing unit, the time of transmission of the audio signal from the at least one apparatus to be located based on the first information signal. The determined time of transmission of the audio signal may be taken into account on the determination of the distance of the at least one apparatus to be located. For example, the first information signal may have sender address information about a logic sender address of the apparatus to be located. The time of transmission of the audio signal may be determined based on the sender address information.

The method may furthermore comprise determining, by the computing unit, a propagating time of the audio signal from the determined time of transmission of the audio signal from the at least one apparatus to be located and from the time of reception of the audio signal at the detecting unit. Furthermore, the method may comprise determining, by the computing unit, the distance of the at least one apparatus to be located from the detecting unit from the determined propagating time of the audio signal.

The method may furthermore comprise transmitting, by the detecting unit, a second information signal to the computing unit via a second deterministic data connection on reception of the audio signal and determining, by the computing unit, the time of reception of the audio signal at the detecting unit based on the second information signal. Additionally or alternatively to this, the method may comprise determining, by the computing unit, the position of the at least one apparatus to be located on board the means of transport based on the determined distance of the at least one apparatus to be located from the detecting unit. Additionally or alternatively to this, the method may comprise allocating, by the computing unit, a logic address to the at least one apparatus to be located, for example taking account of the determined position of the at least one apparatus to be located.

According to a fifth aspect, a computer program comprising program code portions is provided which, when it is loaded into a computer or a processor (for example a microprocessor, microcontroller or digital signal processor (DSP)), or runs on a computer or processor (e.g. a microprocessor, microcontroller or DSP), causes the computer or processor (e.g. microprocessor, microcontroller or DSP) to carry out one or more steps or all of the steps of the above-described aspects or of the above-described method. Moreover, a program storage medium or computer program product comprising the said computer program is provided. For example, the computer program may be stored on the computing unit and cause the computing unit to carry out one or more or all of the aspects and/or steps described with reference to the computing unit.

Even though some of the above-described aspects have been described with reference to the locating device, the locating system or the aircraft, these aspects may also be implemented as a method or as a computer program which carries out the method. Even though only one passenger supply module has been mentioned above as an example of an apparatus to be located, the apparatuses to be located are not limited to this example. Any apparatus which can be arranged on board a means of transport and has an audio source (such as a loudspeaker) or on which an audio source (e.g. a loudspeaker) may be arranged, may serve as an apparatus to be located by means of the locating device. Entertainment systems mounted on board a means of transport or their monitors provided or providable with loudspeakers are mentioned here purely by way of example.

BRIEF DESCRIPTION OF DRAWINGS

Preferred embodiments of the present invention are explained below with the aid of the appended schematic figures, in which:

FIG. 3 shows a flow chart of one embodiment of a method carried out in the locating device and the locating system from FIGS. 1 and 2.

DETAILED DESCRIPTION

In what follows, without being limited thereto, specific details are set out in order to provide a complete understanding of the present invention. However, it is clear to a person skilled in the art that the present invention may be used in other embodiments which may deviate from the details set out below.

It is clear to a person skilled in the art that the explanations set out below may be implemented using hardware circuits, software means or a combination thereof. The software means may be associated with programmed microprocessors or a general computer, an ASCI (Application Specific Integrated Circuit) and/or DSPs (Digital Signal Processors). Moreover, it is clear that even though the following details are described with reference to a method, these details may also be realised in a suitable apparatus unit, a computer processor or storage connected to a processor, the storage being provided with one or more programs which carry out the method when they are executed by the processor.

In what follows, the embodiments are described purely by way of example with reference to an aircraft as an example of a means of transport. Furthermore, in what follows, it is assumed by way of example that the components and units shown in the figures are those of an aircraft. However, the components described below are not limited to a use in aircraft, but may also be arranged in other means of transport, such as trains, buses or ships.

Figure 1:
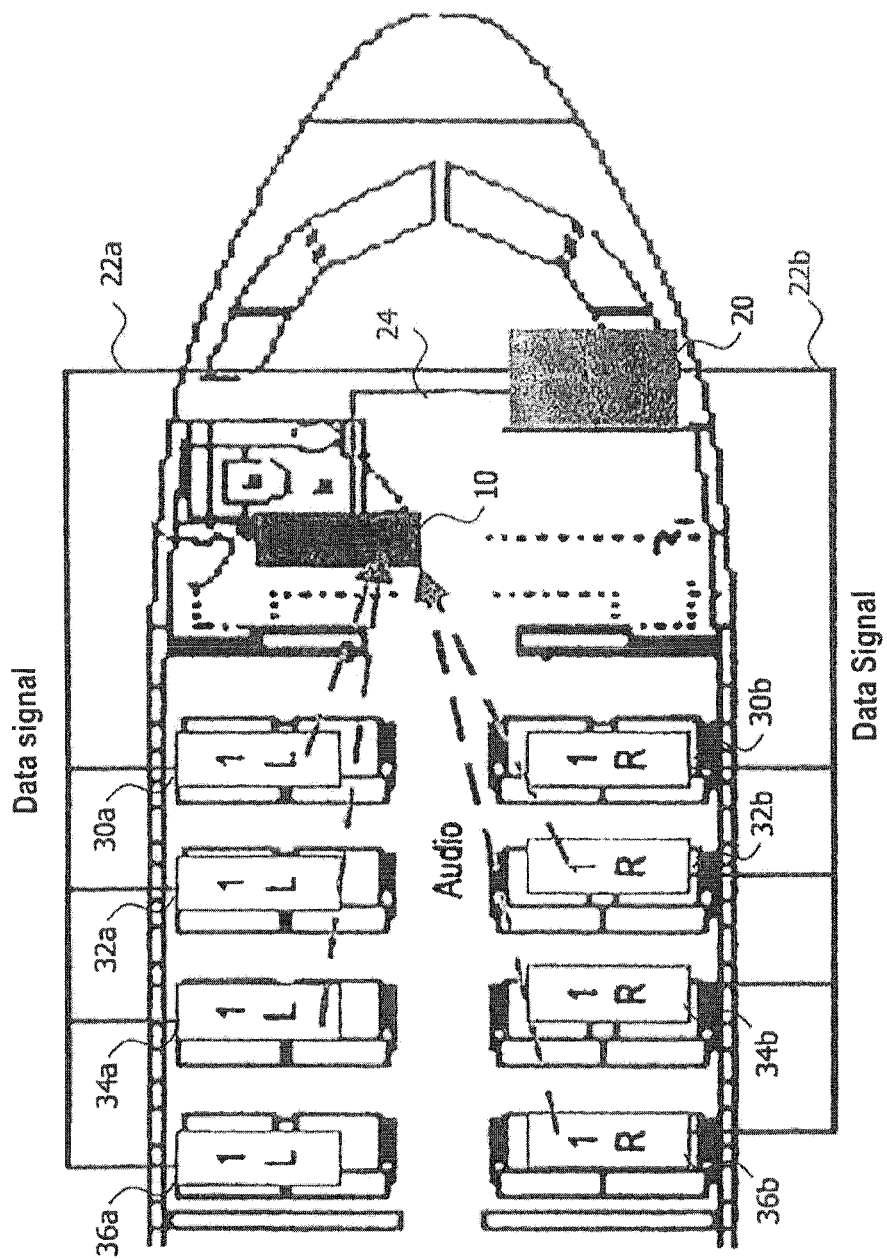
FIG. 1 shows a schematic illustration of one conceivable embodiment of a locating system having one possible embodiment of a locating device.

FIG. 1 shows the basic architecture of a locating system according to one embodiment provided in an aircraft, to be more precise in the cabin of the aircraft. The locating system comprises a detecting unit 10 serving as an audio sink, a server 20 serving as a computing unit and a multiplicity of passenger service units 30a-36b each serving as an audio source, and described below as an example of apparatuses to be located (hereinbelow, use is made of the abbreviations PSU for one passenger service unit and PSUs for a plurality of passenger service units). Even though purely by way of example eight PSUs are shown in FIG. 1, any multiplicity of PSUs may be arranged as part of the locating system in the aircraft.

The PSUs 30a-36b are divided into two groups. A first group of four PSUs 30a-36a is situated on the left-hand side of the centre axis of the aircraft (viewed in the direction of flight of the aircraft). A second group of four PSUs 30b-36b is situated on the right-hand side of the centre axis of the aircraft (viewed in the direction of flight of the aircraft).

A first data bus 22a connects each PSU of the first group of PSUs 30a-36a to the server 20. A second data bus 22b connects each PSU of the second group of PSUs 30b-36b to the server 20. Even though purely by way of example data buses are shown in FIG. 1 for the purpose of illustration, data networks of different topology are conceivable, such as a ring topology, star topology, tree topology, etc.

Furthermore, the detecting unit 10 is connected to the server 20 via a second data connection 24. In the embodiment shown in FIG. 1, the detecting unit 10 and the server 20 form (together with the data connection 24) the locating device. In this embodiment, the detecting unit 10 and the server 20 are arranged spatially separated from one another. Alternatively, however, it is also possible for the detecting unit 10 and the server 20 to form a unit (the locating device). According to the latter alternative, the data connection 24 may be omitted or configured as an internal data connection between the detecting unit 10 and the server 20 in the locating device.

As indicated schematically in FIG. 1 with reference to the PSUs 30a, 34a, 32b, 36b, each of the PSUs 30a-36b is configured to transmit (emit) an audio signal. The audio signal may also be regarded as a sound signal. To emit the audio signal, each of the PSUs 30a-36b has a loudspeaker. The PSUs 30a-36b may be instructed to emit the audio signal e.g. by the server 20 or other control units of the aircraft via the data buses 22a, 22b shown or other data connections.

As indicated schematically in FIG. 1, the detecting unit 10 serves as an audio sink and is accordingly configured to detect or to receive the transmitted audio signal(s). To detect or to receive the audio signal(s), the detecting unit 10 comprises a microphone (not shown). Accordingly, an audio signal (sound signal) is wirelessly transmitted by the audio source (sound source), i.e. one or more of the PSUs 30a-36b, to an audio sink (sound sink), i.e. the detecting unit 10. In the arrangement shown by way of example in FIG. 1, the detecting unit 10 is configured as a handset at the workspace of the purser. As can furthermore be seen in FIG. 1, the detecting unit 10 is situated, in the direction of flight of the aircraft, farther forwards in the cabin than all of the PSUs 30a-36b. The relative arrangement of detecting unit 10 and server 20 is completely flexible. The relative arrangement of detecting unit 10 and server 20, i.e. the relative position of the detecting unit 10 to the server 20 may be known to the server 20.

The PSUs 30a-36b are each configured to output a first information signal or first data signal (which is referred to hereinbelow only as a first data signal) in a specific temporal relationship to the transmission of the audio signal. Purely by way of example, it is assumed below that the PSUs 30a-36b each output the audio signal and the first data signal simultaneously. The PSUs 30a-36b may be instructed to output the first data signal e.g. by the server 20 or may bring about the transmission of the first data signal independently, on transmission of the audio signal. The first data signal is transmitted by the respective PSU 30a-36b via the corresponding data bus 22a, 22b.

If, for example, the PSU 30a emits an audio signal and transmits it wirelessly to the detecting unit 10, it transmits the wired first data signal via the data bus 22a, simultaneously with the wireless transmission of the audio signal. In this case, the PSU 30a sends the first data signal to the server 20 via a first deterministic data connection or a first deterministic data channel. This first deterministic data connection exists, in the case of the PSU 30a, between the interface of the data bus 22a, to which the PSU 30a is connected, and the server 20.

By contrast, if, for example, the PSU 32b emits an audio signal and transmits it wirelessly to the detecting unit 10, it transmits the wired first data signal via the data bus 22b, simultaneously with the wireless emission of the audio signal. In this case, the PSU 32b sends the first data signal to the server 20 via a first deterministic data connection or a first deterministic data channel. This first deterministic data connection exists, in the case of the PSU 32b, between the interface of the data bus 22b, to which the PSU 32b is connected, and the server 20.

In addition to the first deterministic data connection formed in this manner, there exists in the exemplary arrangement shown in FIG. 1 a second deterministic data connection between the detecting unit 10 and the server 20.

Figure 2:
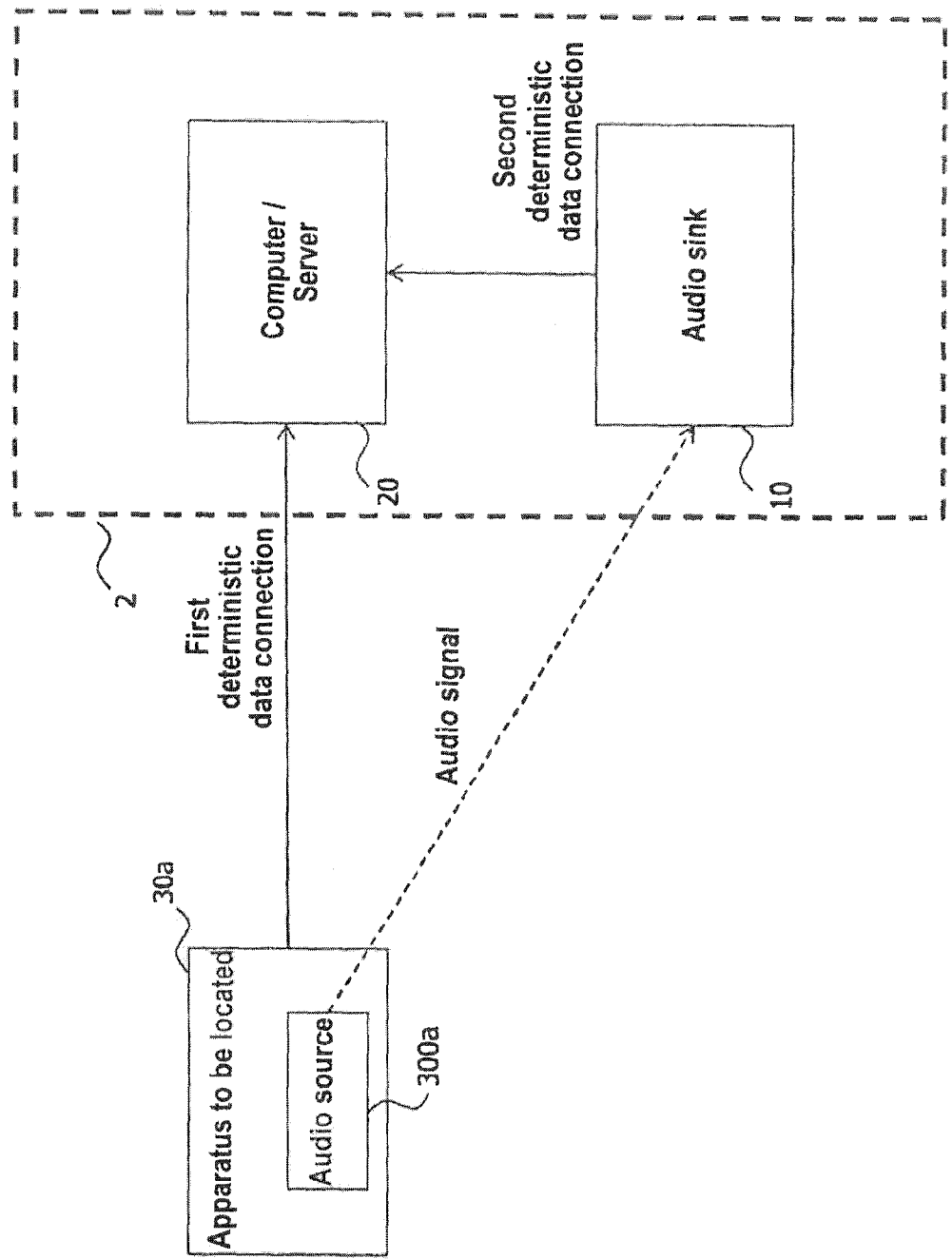
FIG. 2 shows a schematic illustration of a detail of the locating system from FIG. 1 in a slightly modified arrangement.

The mode of functioning of the locating device and the locating system of the embodiment shown in FIG. 1 is now described in more detail with reference to FIG. 2 (the locating device being designated by the reference symbol 2 in FIG. 2). In order to make clear the variability of the embodiment, in FIG. 2 the spatial relationship between the detecting unit 10 and the server 20 is changed compared with FIG. 1. Whereas in FIG. 1 the server 20 is arranged, in the direction of flight, to the right of the detecting unit 10, the server 20 in FIG. 2 is arranged, in the direction of flight, to the left of the detecting unit 10. However, the mode of functioning remains identical.

In describing the mode of functioning, reference is conveniently made to the flow chart from FIG. 3, which illustrates a method according to one embodiment. As shown by means of the broken lines in FIG. 3, the steps 306 and 308 do not have to be carried out here, but are to be considered as purely optional.

First of all, one of the PSUs 30a-36b (purely by way of example, it is assumed below that the PSU 30a is responsible for this) emits an audio signal (or sound signal) via its loudspeaker. This audio signal is transmitted wirelessly (via the air interface present) to the detecting unit 10 configured as an audio sink, which detects the audio signal (step 302) by means of its microphone and converts it into an electrical signal.

Simultaneously with the transmission of the audio signal, the PSU 30a sends a first data signal to the data bus 22a (for the sake of simplicity in this embodiment the simultaneous transmission of the audio signal and the first data signal is assumed, but it is also possible to transmit the two signals offset by a previously known interval). By transmission of the first data signal, the PSU 30a indicates the transmission of the audio signal. The first data signal is sent to the server 20 via the data bus 22a, to be more precise via the first deterministic data connection between the PSU 30a and the server 20.

The reception of the audio signal at the detecting unit 10 is communicated to the server 20 by the detecting unit 10 via the data connection 24, to be more precise the second deterministic data connection 24. This communication is referred to below as the second data signal.

According to a first alternative, the propagating time of the first data signal compared with the sound propagating time of the audio signal is ignored, since it is assumed that the speed of the first data signal is substantially greater than that of the audio signal (e.g. a speed of the first data signal of 2 e8 m/s and a speed of the audio signal of 343 m/s (speed of sound in air at 20° C.)). The server 20 knows the time of reception at which the first data signal has arrived at it. Furthermore, the server 20 can equate the time of transmission of the first data signal with the time of reception of the first data signal, since it ignores the propagating time of the first data signal. Since it is known to the server 20 that the audio signal and the first data signal have been transmitted simultaneously, the server 20 has also determined the time of transmission of the audio signal via the determination of the time of transmission of the first data signal.

According to a second alternative, the PSU 30a transmits its temporary sender address in the first data signal from the PSU 30a to the server 20. With the aid of the sender address, the server 20 can establish the path/length of the first deterministic data connection between the PSU 30a and the server 20. This can be done, for example, as a result of the fact that for each sender address the associated path/length of deterministic data connection is known to the server 20. Since both the delay and the jitter on the first deterministic data connection are known to the server 20, the server 20 can establish the signal propagating time of the first data signal. Furthermore, the server 20 knows the time of reception at which the first data signal has arrived at it. From the time of reception of the first data signal and the signal propagating time of the first data signal, the server 20 determines the time of transmission of the first data signal. Since it is known to the server 20 that the audio signal and the first data signal have been sent out simultaneously, the server 20 has also determined the time of transmission of the audio signal via the determination of the time of transmission of the first data signal.

Moreover, the server 20 can derive the time of reception of the audio signal at the detecting unit 10 from the second data signal. The signal propagating time of the second data signal is known to the server 20 or the latter can determine this from the known path/length of the second deterministic data channel. The server 20 can now determine the time of reception of the audio signal at the detecting unit 10 by subtracting the signal propagating time of the second data signal from the time of reception of the second data signal at the server 20. Alternatively, the server 20 can ignore the signal propagating time of the second data signal. In this case, the server 20 can equate the time of reception of the audio signal at the detecting unit 10 with the time of reception of the second data signal at the server 20.

Thus, both the time of transmission of the audio signal from the PSU 30a and the time of reception of the audio signal at the detecting unit 10 are known to the server 20. As a result, the server 20 knows the sound propagating time of the audio signal from the PSU 30a to the detecting unit 10. With the aid of the speed of sound, the server 20 can now determine the distance between the PSU 30a and the detecting unit 10 (step 304).

By using the deterministic data channels, it is possible to dispense with synchronous clocks on the audio source, on the audio sink and on the computing unit.

Subsequently, for example, the distances of the other PSUs can be determined. Alternatively, first of all the method for the position determination of the PSU 30a and addressing of the PSU 30a is optionally carried out. For the position determination of the PSU 30a and address allocation to the PSU 30a, still further steps may be optionally carried out, which are described below.

On account of the geometry of the aircraft cabin and the topology of the deterministic data network, the position of the PSU 30a can be uniquely determined simply from the distance between audio source and audio sink, namely the detecting unit 10 arranged, for example, at a previously known position. Since the detecting unit 10 as an audio sink is arranged, in the direction of flight of the aircraft, farther forwards than all the PSUs 30a-36b, the audio signal can only have come from one direction, namely from the rear.

As shown schematically in FIG. 1, on account of the offset of the detecting unit 10 relative to the centre axis of the aircraft (in this case the detecting unit 10 is offset towards the left), exactly one position is assigned to each distance. The shortest determinable distance belongs to the PSU 30a, the second shortest to the PSU 30b, the third shortest to the PSU 32a, etc. Thus, the server 20 can determine the position of the audio source (step 306).

Even given any desired arrangement of the detecting unit 10 relative to the centre axis, e.g. on positioning of the detecting unit 10 on the centre axis, unique position determination is possible. In this case, the shortest possible distance can belong both to the PSU 30a and to the PSU 30b. However, the PSUs 30a-36a on the left-hand side are attached to a different data bus 22a than the PSUs 30b-36b of the right-hand side, the PSUs 30b-36b of the right-hand side being attached to the data bus 22b. Additionally, a central seat row could optionally be connected to the server 20 via a further, separated data bus. When the server 20 now receives the first data signal belonging to the audio signal via the left-hand data bus 22a, the server 20 can deduce therefrom that the audio signal comes from the left-hand side (without the server having to take account of address information of the PSUs 30a-36b). Together with the determined distance, the server 20 thereby determines a unique position of the PSU 30a (step 306).

Subsequently, the positions of the further PSUs can be determined or an address allocation to the PSU 30a can optionally take place.

In the latter case, after the position has been determined by the server 20, an address is allocated to the PSU 30a (step 308). This takes place, for example, on the same data channel on which the PSU 30a has previously communicated its audio transmission, i.e. on the channel via which the first data signal was sent. The temporary sender address of the PSU 30a communicated with the audio transmission is replaced by the address allocated by the server 20. In this way, an automatic address allocation takes place.

Subsequently, the steps 302-304 or the steps 302-306 or the steps 302-308 may be repeated for the further PSUs.

The object to be located is automatically located in a simple manner by the above-described embodiment, with the aid of an audio sink arranged at a previously known position and an audio source present at the object to be located. Furthermore, its exact position can be automatically determined. Finally, the address allocation can also take place automatically.

In the above-described locating device and the above-described locating system, no special equipment is required, but resort may be had to an architecture which is present anyway.

By using architecture which is present anyway, no additional infrastructure and no conversion of the PSUs is required. The automatic position determination of the apparatus eliminates the expenditure of time on manual position determination. Through the automatic assignment between logic address and physical position, the possibility of errors during installation is reduced.

The invention claimed is:

1. A locating device for locating at least one apparatus which is to be located and is arrangeable on board a transport apparatus, the locating device comprising:
   a detector configured to detect an audio signal wirelessly transmitted by the at least one apparatus to be located; and
   a computer configured to:
   (i) receive a first information signal transmitted from the at least one apparatus to be located via a wired first deterministic data connection;
   (ii) receive a second information signal output from the detector upon detection of the audio signal;
   (iii) determine a time of transmission of the wirelessly transmitted audio signal by one of:
      equating a time of transmission of the audio signal with a time of reception by the computer of the first information signal; and
      subtracting a known first information signal propagation time of the first information signal between the apparatus to be located and the computer from the time of reception by the computer of the first information signal; and
   (iv) determine a time of reception of the audio signal at the detector by one of:
      equating a time of reception of the audio signal with the time of reception by the computer of the second information signal from the detector; or
      subtracting a known second information signal propagating time between the detector and the computer from the time of reception of the second information signal by the computer; and
   (v) determine a sound propagating time of the audio signal from the at least one apparatus to be located to the detector based on a difference between:
      the determined time of reception of the audio signal at the detector; and
      the determined time of transmission of the audio signal; and
   (vi) determine a distance of the at least one apparatus to be located from the detector based on the determined sound propagating time of the audio signal, wherein
   the first information signal comprises sender address information about a logic sender address of the apparatus to be located and
   the computer is configured to determine the time of transmission of the audio signal based on the sender address information.

2. The locating device according to claim 1, wherein the detector is configured to output the second information signal to the computer immediately on reception of the audio signal.

3. The locating device according to claim 1, wherein:
   the detector is connected to the computer via a second deterministic data connection, and
   the detector is configured to output the second information signal via the second deterministic data connection on reception of the audio signal.

4. The locating device according to claim 1, wherein the computer is further configured to deter line the position of the at least one apparatus to be located on board the transport apparatus based on the determined distance of the at least one apparatus to be located from the detector.

5. The locating device according to claim 1, wherein the computer is further configured to allocate a logic address to the at least one apparatus to be located, by taking account of the determined position of the at least one apparatus to be located.

6. The locating system for locating at least one apparatus which is to be located and is arrangeable on board a transport apparatus the locating system comprising:
a detector configured to detect an audio signal wirelessly transmitted by the at least one apparatus to be located; and
a computer configured to:
(i) receive a first information signal transmitted from the at least one apparatus to be located via a wired first deterministic data connection;
(ii) receive a second information signal output from the detector upon detection of the audio signal;
(iii) determine a time of transmission of the wirelessly transmitted audio signal by one of:
equating a time of transmission of the audio signal with a time of reception by the computer of the first information signal; and
subtracting a known first information signal propagation time of the first information signal between the apparatus to be located and the computer from the time of reception by the computer of the first information signal; and
(iv) determine a time of reception of the audio signal at the detector by one of:
equating a time of reception of the audio signal with the time of reception by the computer of the second information signal from the detector; or
subtracting a known second information signal propagating time between the detector and the computer from the time of reception of the second information signal by the computer; and
(v) determine a sound propagating time of the audio signal from the at least one apparatus to be located to the detector based on a difference between:
the determined time of reception of the audio signal at the detector; and
the determined time of transmission of the audio signal; and
(i) determine a distance of the at least one apparatus to be located from the detector based on the determined sound propagating time of the audio signal; and
the at least one apparatus to be located; wherein
the first information signal comprises sender address information about a logic sender address of the apparatus to be located and
the computer is configured to determine the time of transmission of the audio signal based on the sender address information.

7. The locating system according to claim 6, the detector comprising a microphone or being configured as such and the at least one apparatus to be located comprising a passenger supply module having at least one loudspeaker or being configured as such.

8. A method for locating at least one apparatus which is to be located and is arrangeable on board a transport apparatus the method comprising the steps:

(i) transmitting, by the at least one apparatus to be located, an audio signal wirelessly and a first information signal by a wired first deterministic data connection;
(ii) detecting, by a detector, the audio signal wirelessly transmitted by the at least one apparatus to be located,
(iii) outputting, by the detector, a second information signal to a computer upon detection of the audio signal; and
(iv) receiving, by the computer, the first information signal transmitted from the at least one apparatus to be located via the wired first deterministic data connection;
(v) receiving, by the computer, the second information signal transmitted by the detector;
(vi) determining, by the computer a time of transmission of the wirelessly transmitted audio signal by one of:
equating a time of transmission of the audio signal with a time of reception by the computer of the first information signal; and
subtracting a known first information signal propagation time of the first information signal between the apparatus to be located and the computer from the time of reception by the computer of the first information signal; and
(vii) determining, by the computer, a time of reception of the audio signal at the detector by one of:
equating a time of reception of the audio signal with the time of reception by the computer of the second information signal from the detector; or
subtracting a known second information signal propagating time between the detector and the computer from the time of reception of the second information signal by the computer; and
(viii) determining, by the computer, a sound propagating time of the audio signal from the at least one apparatus to be located to the detector based on a difference between:
the determined time of reception of the audio signal at the detector; and
the determined time of transmission of the audio signal; and
(ix) determining, by the computer, a distance of the at least one apparatus to be located from the detector based on the determined sound propagating time of the audio signal;
wherein the first information signal has sender address information about a logic sender address of the apparatus to be located and the time of transmission of the audio signal being determined based on the sender address information.

9. The method according to claim 8, the method furthermore having at least one of the following steps:
transmitting, by the detector, the second information signal to the computer via a second deterministic data connection on reception of the audio signal;
determining, by the computer, the position of the at least one apparatus to be located on board the transport apparatus based on the determined distance of the at least one apparatus to be located from the detector;
allocating, by the computer, a logic address to the at least one apparatus to be located, for example taking account of the determined position of the at least one apparatus to be located.

* * * * *